Figures 1, 2:
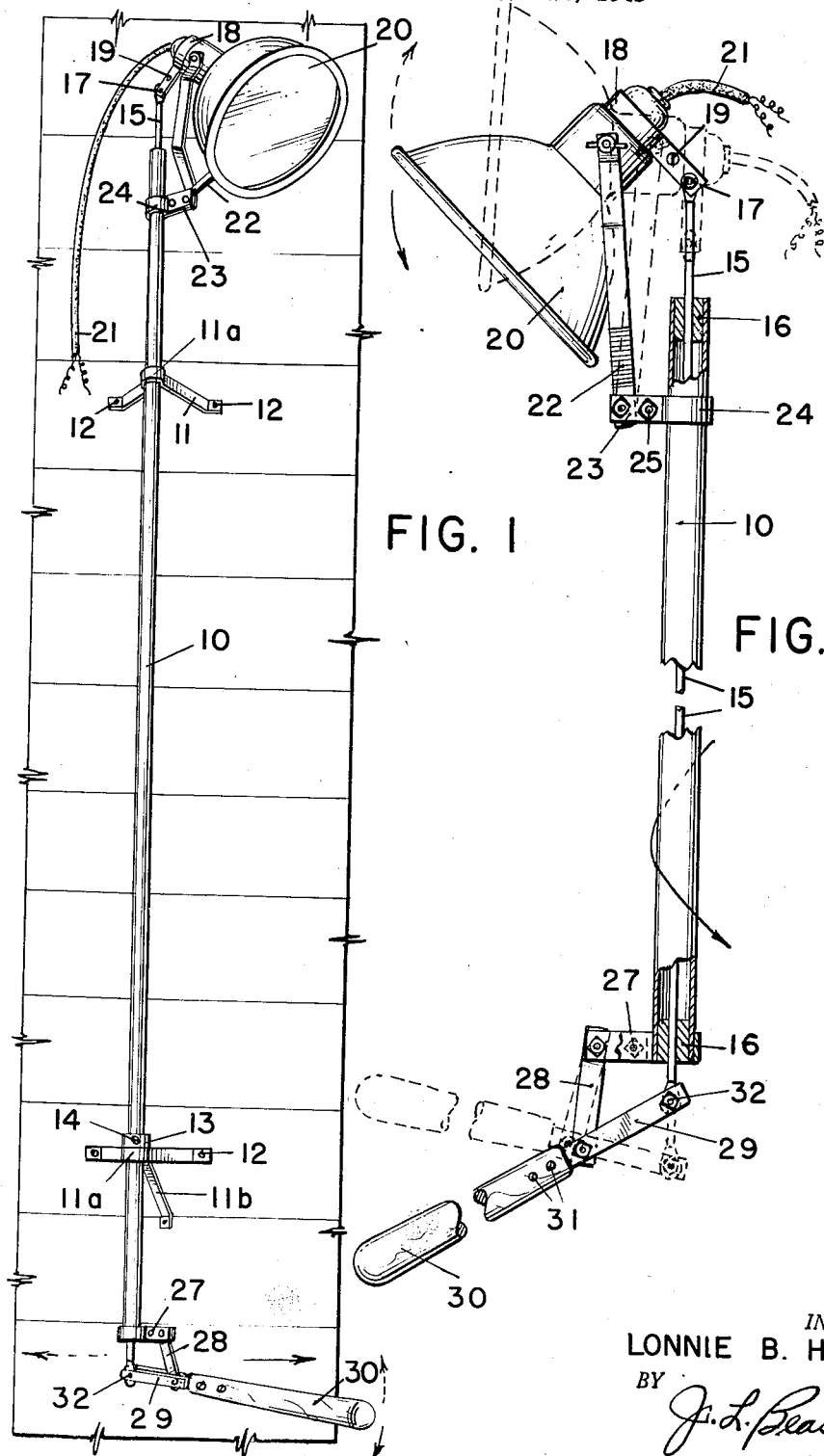

Nov. 6, 1951  L. B. HILL  2,574,211
DIRIGIBLE FLOODLIGHT
Filed Feb. 24, 1948

INVENTOR.
LONNIE B. HILL,
BY
*J. L. Beasley Jr*
AGENT

Patented Nov. 6, 1951

2,574,211

UNITED STATES PATENT OFFICE 2,574,211

DIRIGIBLE FLOODLIGHT

Lonnie B. Hill, Enid, Okla.

Application February 24, 1948, Serial No. 10,441

2 Claims. (Cl. 240—61.13)

This invention relates to dirigible floodlights of the type that are especially adapted for outdoor illumination. In one of its aspects, the invention relates to adjustable floodlights which are attached to buildings or stands and are adapted for illuminating yards, farms, industries and signs which require illumination and which may be manually directed from place to place at the wish of the operator. In one of its most particular aspects, the invention relates to a floodlight which is adapted for the illumination of yards and for remote manual control.

An object of the invention is to provide an improved floodlight and stand which is readily installed and adaptable to various locations. Another object is to provide an improved mounted floodlight which may be readily adjusted and manipulated to illuminate any particular place. A further object is to provide such a readily adjustable and effective floodlight with a minimum of parts which may be subject to wear and mechanical operational difficulties. Other objects will be obvious to one familiar with the use and need of such floodlights from the following description and accompanying drawing.

The figures of the drawing illustrate an embodiment of the present invention showing the dirigible floodlight mounted on a wall of a building. Figure 1 is a plan view showing the arrangement of the various parts of the light and stand as it may be mounted to the side of a building. Figure 2 illustrates a side view of the light and stand partly in cross section showing the details of construction.

In the drawing which shows the floodlight and stand, the numeral 10 represents a hollow, tubular shaft rotatably located in encircling collars 11a forming a part of at least two wall braces 11 which support the shaft vertically away from a rigid base, such as a wall, to which the branching arms of the braces are fastened, as by screws inserted through suitable holes 12 in flanging tips of the braces. One or more of the braces may have as a part thereof, at least one additional arm 11b branching and extending downwardly against the rigid base to assist in supporting the light and its stand and to resist the tendency of the stand to pull loose from the supporting base and fall downwardly. The hollow shaft is prevented from slipping through the collars of the braces by a shaft ring 13 of outer diameter larger than the inner diameter of the brace collars. The shaft ring 13 is adapted to ride on one of the brace collars and is firmly attached to the shaft above the brace at a point on the shaft such that only a desired amount of the shaft will extend beyond the lowermost brace collar. A screw 14 may be used in a threaded hole in the shaft ring to lock the collar at the selected point on the shaft. If required to prevent upward slippage of the shaft in the collars, a similar shaft ring may be attached to the shaft at a point immediately below one of the brace collars. However, the weight of the shaft and attachments will ordinarily make this unnecessary.

Within and throughout the length of the shaft and extending materially beyond the ends thereof is a solid push rod 15 of diameter appreciably smaller than that of the shaft. Each end of the rod is flattened for a short distance from the end and is provided with a hole to receive bolts for attaching other parts of the structure as described below. The push rod is centered by means of bushings 16 in each end of the hollow shaft and is free to move longitudinally through an opening in the center of each bushing. To the upper end of the rod, a double link 17 is pivotally attached and a light collar 18, which may preferably be an integral part of the link, connects with the opposite end of the link. The double link has holes 19 through which a bolt is thrust and secured by a nut (not shown), by means of which the light collar may be tightened when it forms an integral part of link 17. The light collar and the double link may be constructed from a single strip of metal of appropriate length by preshaping the collar and flanging the ends of the strip to form the link section as illustrated, or the collar and the link may be separate parts securely joined together. The light collar is designed to fit snugly about the neck of a conventional floodlight or lamp and reflector, represented by the lamp 20. An electric cord 21 extends from the lamp to a source of electric current (not shown). Intermediate the reflector of the lamp and the point at which the light collar encircles the neck of the lamp, a light yoke 22 is pivotally attached. This yoke is shown as a bracket with a pair of arms branching from a common stem to connect with either side of the lamp. The stem of the yoke is pivotally connected to parallel flanges forming a part of a shaft bracket 23 which consists of the flanges and a collar 24. This collar solidly attaches to the shaft 10 near the upper end thereof. Collar 24 may be tightened by means of a nut 25 on a threaded bolt extending through the flanges.

At the lower end of the shaft there is a second shaft bracket 27 similar to the one fastened at the upper end of the shaft. The collar of the bracket is solidly attached to the lower end of the shaft and the outer ends of the parallel flanges are pivotally connected with one end of a link 28. The opposite end of this link is in turn pivotally connected intermediate the ends of a set of parallel bars 29 forming a part of a handle. One end of the parallel bars fits into a slot in the end of a handle grip 30 to which the parallel bars are secured by a set of nuts and bolts at 31. The opposite ends of the parallel bars are pivotally connected by a bolt and nut 32 to the lower end of the push rod extending beyond the shaft of the stand, the free unattached end of the handle being forward of the shaft and below the reflector of the lamp, as shown.

The operation of the floodlight may be easily understood by reference to the drawing where the possible degrees of motion are indicated and by reference to the description of the construction above. The motion of the lamp responds directly to a change of position of the handle. As the handle 30 is moved back and forth in a horizontal plane, the movement causes the shaft 10 to rotate in the collars of the braces 11 and the lamp 20 likewise moves horizontally, following the movement and direction of the handle. As the handle is raised or lowered vertically, a corresponding movement is translated to the lamp by means of the push rod 15. Figure 2 shows one position of the lamp, handle and essential parts in solid lines and the relative displacement of these parts in another position of the floodlight when the handle has been raised vertically to another position. The lamp will remain in any position in which it is placed due to the frictional resistance between the surfaces of the push rod and the bushings and the support of the various parts.

Various modifications may be made in the relative size and construction of the parts without departing from the general structure and apparatus shown and described. Lamps of different designs may be used and the light yoke 22 and light collar 18 may be modified to accommodate a different lamp. The light yoke may be angular as illustrated or U-shaped in form. The upper bracket 23 connected to the light yoke may be secured to the shaft 10 somewhat below the end of the shaft as shown, or nearer or farther from the end of the shaft depending upon the length of the yoke arms and relative angle it is desired to have the lamp depending with respect to the position of the handle. The possible range of the vertical movement of the lamp will be, in part, a function of the extent to which the push rod extends beyond each end of the shaft and the relative lengths of the flanges of the shaft brackets and the link connecting the handle therewith. By proper adjustment of these relative lengths it is possible to be arranged to permit the lamp to be raised or lowered through an arc of practically 180°. However, practical use of the floodlight for illuminating yards and particular areas requires only a much smaller degree of freedom of movement, which will usually not exceed an arc of 50° to 70°.

The horizontal adjustment of the floodlight is limited merely by the extent to which the handle 30 may be rotated before striking the supporting base to which the braces 11 are attached. Although this base has been illustrated as the wall of a building or house, it is understood that the floodlight could be as effectively attached to a pole or other support, which may be either stationary or movable. Also it is understood that the location of the floodlight on the base support with relation to the ground or platform from which it may be operated, is purely optional, but will preferably be within reach of any person operating it. Similarly the length of the shaft and the corresponding length of the push rod will depend upon the height to which it is desired to place the source of illumination. The higher the lamp is placed the wider will be the area illuminated for any given floodlight. For illuminating an ordinary home yard, a suitable height for the handle above the ground has been found to be about four feet and a satisfactory length for the shaft and push rod have been found to be from 6 to 10 feet and from 6½ to 11 feet, respectively.

With the foregoing description, I have provided an improved floodlight which is easily constructed and assembled and readily installed. There are a minimum of operating parts and the floodlight is positive in its action. The improvements above described provide a floodlight which includes an efficient and effective remote control for the lamp and provide a means for directing rays of the light in any direction desired by a simple adjustment of a single handle in either a vertical or horizontal plane or through a movement in a combination of these planes.

Various modifications as sugegsted above and others may be made in the structure without departing from the spirit of the invention and the inherent scope of the disclosure.

I claim:

1. A floodlight adapted for illuminating a relatively wide area in the immediate vicinity of said floodlight which comprises in combination a floodlamp which consists of a reflector and a neck into which electrical connections are recessed and which is attached as hereinafter described to a supporting shaft; a long tubular supporting shaft; a single continuous push rod extending centrally throughout the entire length of said supporting shaft and beyond the ends thereof; a light bracket consisting of a collar firmly attached to the rear of said floodlamp and of flanges pivotally attached to the upper end of said push rod; a first shaft bracket consisting of flanges and a shaft-encircling collar firmly attached to the upper end of said shaft with said flanges forward of said shaft; a Y-shaped yoke, the stem of which is pivotally attached to the outer tips of the flanges of said first shaft bracket and the arms of which are pivotally attached to opposite sides of said floodlamp intermediate the connection of the light bracket thereto and the reflector thereof; at least two supporting braces consisting of a brace collar for encircling said shaft and of a pair of branching arms with flanged tips for attachment to a rigid base, the lowermost of which has a third downwardly extending arm with said flanged tip; at least one shaft ring fastened to said shaft and adapted to abut a brace collar to prevent longitudinal movement of said shaft; a second shaft bracket consisting of flanges and a shaft-encircling collar firmly attached to the lower end of said supporting shaft with said flanges forward of said shaft; a link pivotally connected at one end with the flanges of said second shaft bracket; and a handle pivotally connected intermediate the ends thereof to said link and at one end thereof to the lower end of said push rod, the free end of said handle extending forward of said shaft below the reflector of said floodlamp.

2. A floodlight adapted for illuminating a relatively wide area in the immediate vicinity of said floodlight which comprises in combination a floodlamp which consists of a reflector and a neck into which electrical connections are recessed and which is attached as hereinafter described to a supporting shaft; a long tubular supporting shaft; a single continuous push rod extending centrally throughout the entire length of said supporting shaft and beyond the ends thereof; a light bracket consisting of a collar firmly attached to the rear of said floodlamp and of flanges pivotally attached to the upper end of said push rod; a first shaft bracket consisting of flanges and a shaft-encircling collar firmly attached to the upper end of said shaft with said flanges forward of said shaft; a Y-shaped yoke, the stem of which is pivotally attached to the outer tips of the flanges of said first shaft bracket and the arms of which are pivotally attached to opposite sides of said floodlamp intermediate the connection of the light bracket thereto and the reflector thereof; a second shaft bracket consisting of flanges and a shaft-encircling collar firmly attached to the lower end of said supporting shaft with said flanges forward of said shaft; a link pivotally connected at one end with the flanges of said second shaft bracket; and a handle pivotally connected intermediate the ends thereof to said link and at one end thereof to the lower end of said push rod, the free end of said handle extending forward of said shaft below the reflector of said floodlamp.

LONNIE B. HILL.

REFERENCES CITED

The following references are of record in the file of this patent:

UNITED STATES PATENTS

| Number | Name | Date |
|---|---|---|
| 718,332 | Farrell | Jan. 13, 1903 |
| 2,025,064 | Marsters | Dec. 24, 1935 |
| 2,281,047 | Pennow | Apr. 28, 1942 |
| 2,483,615 | Benson | Oct. 4, 1949 |

FOREIGN PATENTS

| Number | Country | Date |
|---|---|---|
| 627,931 | France | June 20, 1927 |